United States Patent
Imoto

(10) Patent No.: US 6,788,478 B2
(45) Date of Patent: Sep. 7, 2004

(54) VEHICLE PERIPHERY VISUAL CONFIRMING APPARATUS

(75) Inventor: Masayoshi Imoto, Nagoya (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 10/265,318

(22) Filed: Oct. 7, 2002

(65) Prior Publication Data

US 2003/0067693 A1 Apr. 10, 2003

Related U.S. Application Data

(63) Continuation-in-part of application No. 09/906,789, filed on Jun. 18, 2001, now abandoned.

(30) Foreign Application Priority Data

Jul. 31, 2000 (JP) .......................................... 2000-231211

(51) Int. Cl.[7] ............................................... G02B 7/18
(52) U.S. Cl. ..................................................... 359/831
(58) Field of Search .................................. 359/831, 833, 359/834, 843, 844; 348/148, 49; 340/435, 436

(56) References Cited

U.S. PATENT DOCUMENTS 6,046,766 A    4/2000  Sakata
6,166,764 A    12/2000 Sakata ........................ 348/148

FOREIGN PATENT DOCUMENTS

EP      0 750 219 A1     12/1996
JP      20000-89301      3/2000

*Primary Examiner*—Euncha P. Cherry
(74) *Attorney, Agent, or Firm*—Oliff & Berridge, PLC

(57) ABSTRACT

In a vehicle periphery visual confirming apparatus 1A, the vertical angle portion 5 of a prism 4 is chamfered by cutting away the vertical angle adjacent areas 5L, 5R, and light rays 18R (18L) entering the portion of the prism 4, where the vertical angle adjacent areas 5R (5L) was once present, are allowed to pass in front of the chamfered surface 5a and go to the outside through the penetration window portion 2L (2R) of a case, or, are allowed to enter the chamfered surface 5a and are scattered by the rough surface of the chamfered surface 5a, so that the light rays are prevented from advancing into the prism 4.

4 Claims, 9 Drawing Sheets

VEHICLE PERIPHERY VISUAL CONFIRMING APPARATUS

This application is a Continuation-In-Part of U.S. patent application Ser. No. 09/906,789, filed on Jul. 18, 2001 now abandoned.

BACKGROUND OF THE INVENTION

1. Field of the Invention

The present invention relates to a vehicle periphery visual confirming apparatus which, under a poor visibility condition, takes a picture of a peripheral scene before or behind a vehicle, or, on the right- or left-side scene of the vehicle, that is, the scene of a blind spot to a driver and displays the picture of the scene to the driver.

2. Description of the Related Art

A conventional vehicle periphery visual confirming apparatus 1, as shown in FIGS. 2 and 7, comprises a picture camera apparatus 11 disposed on a front bumper 17 of a vehicle 16 to take pictures of the two side scenes of the vehicle 16, a mirror image reversal processing part 12 for mirror-image processing picture signals supplied from the picture camera apparatus 11, and a display part 15 disposed within a vehicle room for displaying the picture images obtained from the mirror image reversal processing part 12.

The picture camera apparatus 11 comprises: a lightproof case 3 on the two sides of which there are formed a pair of left and right penetration window portions 2L, 2R; a prism 4 having an isosceles-triangular-shaped section stored in the interior portion of the case 3 and disposed in such an attitude that its vertical angle portion 5 faces the front portion of the case 3 and its left and right prism side surfaces 8L, 8R respectively face the left and right penetration window portions 2L, 2R; and, an imaging device 10 stored and disposed in the rear of the rear surface 8B of the prism 4 through an imaging lens 9.

In this structure, light rays 18L, which have entered from the penetration window portion 2L and have penetrated through the prism side surface 8L, are reflected by the internal surface of the other prism side surface 8R and are then guided through the imaging lens 9 onto the left half surface 10L of the imaging surface of the imaging device 10. On the other hand, light rays 18R, which have entered from the penetration window portion 2R and have penetrated through the prism side surface 8R, are reflected by the internal surface of the other prism side surface 8L and are then guided through the imaging lens 9 onto the right half surface 10R of the imaging surface of the imaging device 10. That is, the pictures of the two right- and left-side scenes can be taken at the same time by the imaging device 10.

And, the image signals of the pictures of the scenes taken by the imaging device 10 are mirror-image-reversal processed by the mirror image reversal processing part 12 and are then output to the display part 15; and, the left-side scene introduced from the penetration window portion 2L into the left half screen 15L of the display part 15 is displayed as the left-side scene images, whereas the right-side scene introduced from the penetration window portion 2R into the right half screen 15R of the display part 15 is displayed as the right-side scene images.

However, actually, as shown in FIG. 7, in the light rays 18R which have entered the vertical angle adjacent area 5R of the prism side surface 8R, there exist light rays such as light rays 18Ra which, after they are reflected by the internal surface of the prism side surface 8L and are penetrated through the imaging lens 9, are not guided to the right half surface 10R of the imaging surface of the imaging device 10 but are guided to a boundary area 10La on the left half surface 10L side. In this case, the light rays 18R of the right-side scene are taken in from the penetration window portion 2L by the imaging device 10 and are mingled with the light rays 18L of the left-side scene guided to the same boundary area 10La, before they are converted into image signals. And, in a boundary area 10Ra on the right half surface 10R side of the imaging surface as well, because they are symmetric, there occurs a similar phenomenon.

As a result of this, there arises the following problem: that is, the images to be displayed on the display part 15, as shown in FIG. 9, are displayed in the screen central portion 23 of the display part 15 in such a manner that the left-side scene images 19L and right-side scene images 19R are overlapped with each other.

SUMMARY OF THE INVENTION

The present invention aims at eliminating the above drawbacks found in the conventional vehicle periphery visual confirming apparatus. Accordingly, it is an object of the invention to provide a vehicle periphery visual confirming apparatus capable of preventing one-side scene images and the-other-side scene images from being displayed in such a manner that they are overlapped together in the central portion of the display screen.

In attaining the above object, according to a first aspect of the invention, there is provided a vehicle periphery visual confirming apparatus comprising a picture camera apparatus disposed on the outside of a vehicle, the picture camera apparatus comprising: a case including a pair of right and left penetration window portions respectively formed on the two sides thereof; a prism having an isosceles-triangular-shaped section and disposed within the case in such an attitude that its vertical angle portion faces the front portion of the case and its right and left prism side surfaces corresponding to the two equal sides of its isosceles triangle shape respectively face the right and right penetration window portions; an imaging lens disposed in the rear of the prism rear surface; and, an imaging device which is disposed in the rear of the imaging lens and also which, when light rays entering from one of the right and left prism side surfaces are reflected by the other of the right and left prism side surfaces and are radiated from the prism rear surface of the prism, focuses the light rays onto an imaging surface of the imaging device through the imaging lens to thereby convert the light rays into image signals, characterized by preventive means which is disposed in the vertical angle portion of the prism and also which, when light rays penetrate through one of the penetration window portions and one of the vertical angle adjacent areas of the prism side surfaces sequentially, are reflected by the internal surface of the other-side prism side surface, are radiated from the prism rear surface, and are focused through the imaging lens onto the other-side half surface area of the imaging surface of the imaging device, can be prevent such light rays from advancing into the prism through the vertical angle adjacent areas of the two prism side surfaces.

According to a second aspect of the invention, in a vehicle periphery visual confirming apparatus as set forth in the first aspect of the invention, the preventive means is means formed by chamfering the vertical angle portion of the prism in such a manner that the vertical angle adjacent areas of the two prism side surfaces are cut away from the prism.

According to a third aspect of the invention, in a vehicle periphery visual confirming apparatus as set forth in the first aspect of the invention, the preventive means is a light shielding member disposed in the vertical angle adjacent areas of the two prism side surfaces so as to cover them.

According to a fourth aspect of the invention, in a vehicle periphery visual confirming apparatus as set forth in the third aspect of the invention, the light shielding member is formed integral with the case.

According to a fifth aspect of the invention, in a vehicle periphery visual confirming apparatus as set forth in the third aspect of the invention, the light shielding member is formed integral with a prism fixing member for fixing the prism to the case.

According to a sixth aspect of the invention, in a vehicle periphery visual confirming apparatus as set forth in the second aspect of the invention, the preventive means further includes a light shielding member disposed at the chamfered area of the prism. The light shielding member may be formed integrally with a prism fixing member.

According to a seventh aspect of the invention, in a vehicle periphery visual confirming apparatus as set forth in the sixth aspect of the invention, the light shielding member is formed integrally with a front portion of the case and blocks light from entering the prism through the chamfered surface.

According to an eighth aspect of the invention, in a vehicle periphery visual confirming apparatus as set forth in the sixth aspect of the invention, the prism fixing member is formed integrally with the case.

DETAILED DESCRIPTION OF THE PREFERRED EMBODIMENTS

Now, a description will be given in more detail of preferred embodiments of the invention with reference to the accompanying drawings.

(First Embodiment)

Figure 1:
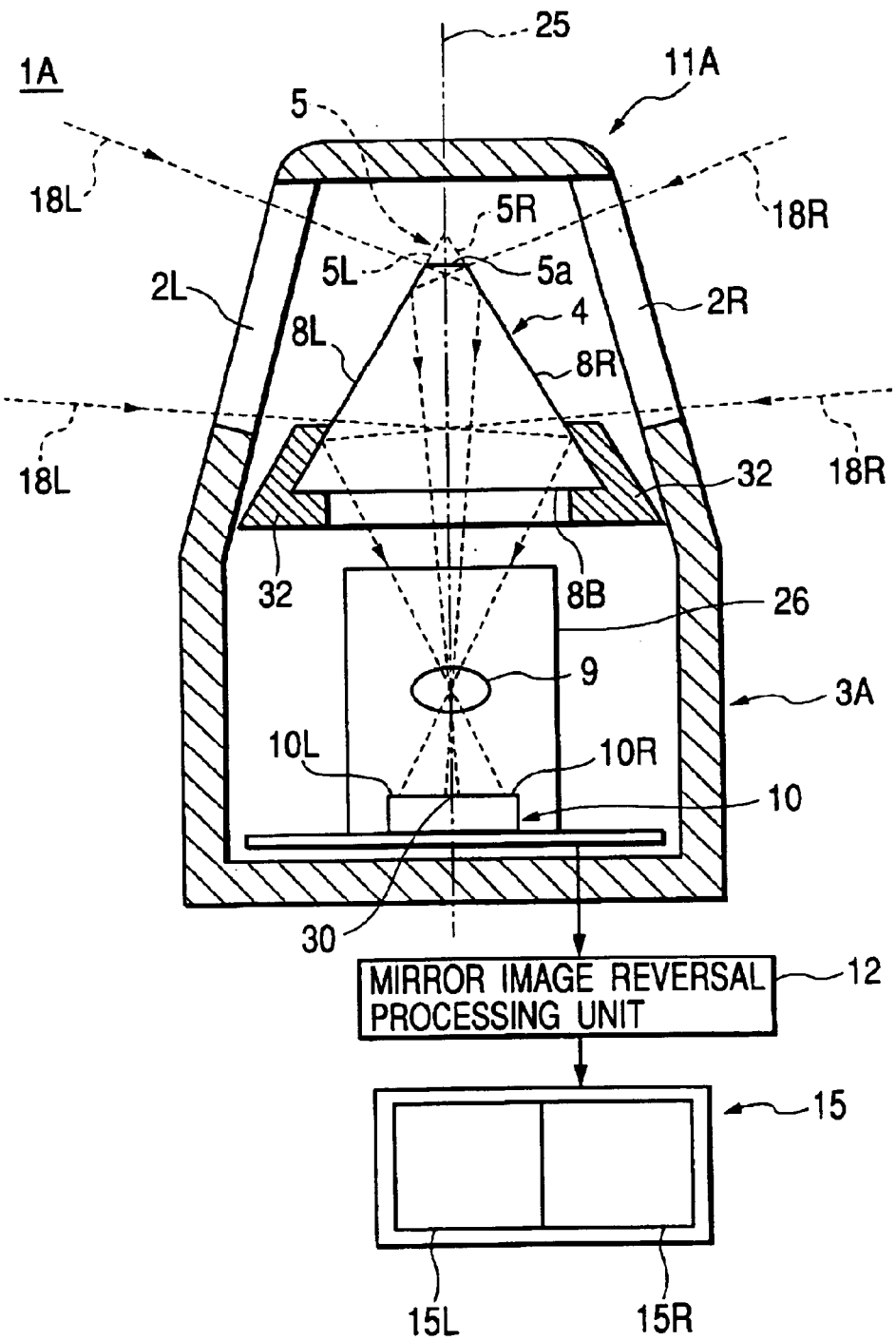
FIG. 1 is a schematic view of the structure of a vehicle periphery visual confirming apparatus according to a first embodiment of the invention.

Now, description will be given below of a first embodiment of a vehicle periphery visual confirming apparatus according to the invention with reference to FIGS. 1 and 2. FIG. 1 is a schematic view of the structure of a vehicle periphery visual confirming apparatus according to the first embodiment of the invention, and FIG. 2 is a view of a state of a vehicle on which there is disposed a picture camera apparatus forming part of the present vehicle periphery visual confirming apparatus, showing a state in which the picture camera apparatus is disposed in a vehicle.

Figure 2:
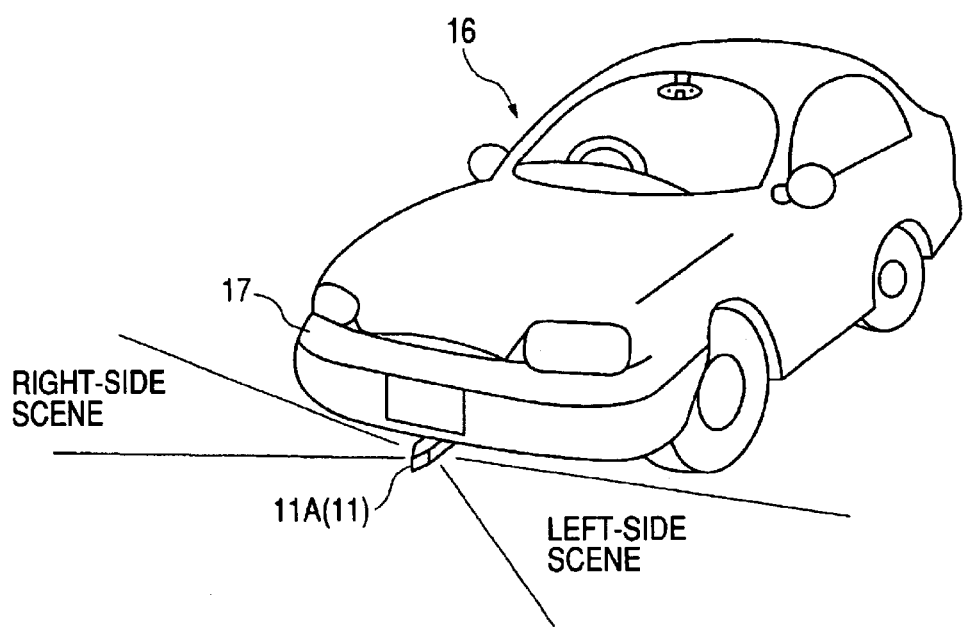
FIG. 2 is a view of a state of a vehicle on which there is disposed a picture camera apparatus forming a part of a vehicle periphery visual confirming apparatus according to the first embodiment of the invention.

The vehicle periphery visual confirming apparatus 1A according to the present embodiment, as shown in FIGS. 1 and 2, comprises a picture camera apparatus 11A which is to be disposed on the outside portion of a vehicle 16, for example, on a front bumper 17 or a front grille thereof, a mirror image reversal processing part 12 which mirror image reversal processes the signal of the image taken by the picture camera apparatus 11A, and a display part 15 composed of an LCD or a CRT which is disposed on a dashboard within a vehicle chamber so as to be able to output and display the image signals that have been processed by the mirror image reversal processing part 12.

The picture camera apparatus 11A comprises: a lightproof case 3A including a pair of left and right penetration window portions 2L, 2R which are formed of glass or plastic and are respectively formed on the two side surfaces of the case 3A; a prism 4 disposed within the case 3A and formed as a prismatic body having an isosceles-triangular-shaped section; an imaging lens 9 disposed within the case 3A; and, an imaging device 10 disposed within the case 3A and including a CCD camera.

The prism 4 is disposed in the interior portion of the case 3A, while it is fixed, for example, by a prism fixing member 32, in such an attitude that the vertical angle portion 5 thereof faces the front portion of the case 3A and the prism side surfaces 8L, 8R thereof face the penetration window portions 2L, 2R of the case 3A.

Here, the prism fixing member 32 not only has a function to hold the prism 4 from right and left so as to cover the respective rear side areas (in FIG. 1, the lower areas) of the prism side surfaces 8L, 8R but also a function to shield the unnecessary light rays that enter the rear side areas of the prism side surfaces 8R, 8L (in FIG. 1, the lower areas of the prism side surfaces 8R, 8L) but do not constitute the right- and left-side scenes.

Also, the vertical angle portion 5 of the prism 4 is chamfered in the chamfer dimension that the vertical angle adjacent areas 5L, 5R of the prism side surfaces 8R, 8L are cut away, and a surface 5a formed by this chamfering operation is processed so as to provide a rough surface (a frosted-glass-like surface) in order to be able to prevent the light rays from entering the interior portion of the prism 4 from the chamfered surface 5a (such treatment is referred to as a chamfering operation).

Figure 7:
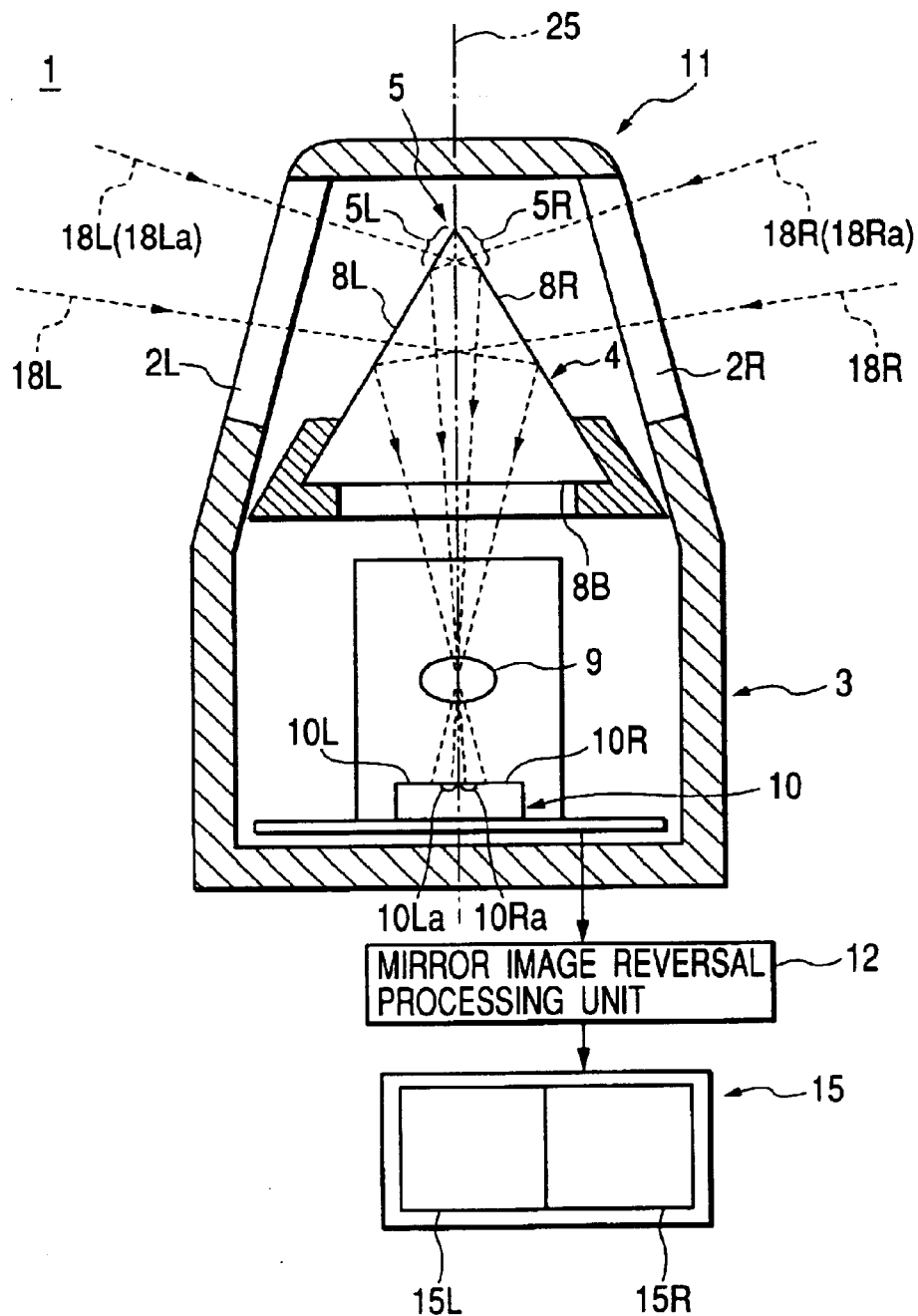
FIG. 7 is a schematic view of the structure of a conventional vehicle periphery visual confirming apparatus.

Here, the range of the vertical angle adjacent areas 5R (5L) to be cut away is specified in the following manner: that is, of the prism side surface 8R (8L), a range through which light rays 18R (18L) pass; by the way, the light rays 18R (18L), as shown in FIG. 7, enter the interior portion of the prism 4 from one prism side surface 8R (8L), are reflected by the internal surface of the other prism side surface 8L (8R), and are guided through the imaging lens 9 onto the left half surface 10L (right half surface 10R) of the imaging surface of the imaging device not onto the right half surface 10R (left half surface 10L) thereof.

And, the imaging lens 9 is fixed by a lens holder 26 in such a manner that, in the rear of the prism 4 (in FIG. 1, in the lower portion thereof), the optical axis 25 of the imaging lens 9 is coincident with the bisector of the vertical angle portion 5 of the isosceles-triangular-shaped section of the prism 4. And, the imaging device 10 is fixed in such a manner that, in the rear of the imaging lens 9, the imaging surfaces 10L, 10R are parallel to the prism rear surface 8B and the center 30 of the boundary line between the left and right half surfaces 10L and 10R of the imaging surface is present on the optical axis 25. By the way, in this structure, the prism side surfaces 8L, 8R are disposed symmetric with respect to the optical axis 25.

That is, by chamfering the vertical angle portion 5 of the prism 4 in the above-mentioned manner, for example, of the light rays 18R that correspond to the right-side scene, light rays (not shown in FIG. 1) passing through a portion where the vertical angle adjacent area 5R was once present, such as the light rays 18Ra shown in FIG. 7, pass in front of the chamfered surface 5a (in FIG. 1, upwardly of the chamfered surface 5a) and go to the outside through the penetration window portion 2L, or enter the surface 5a, are scattered by the rough surface of the surface 5a, so that they are prevented from advancing into the prism 4. On the other hand, the light rays 18R entering the other areas of the prism side surface 8R than the vertical angle adjacent area 5R thereof penetrate through the transparent window portion 2R and prism side surface 8R sequentially, are reflected by the internal surface of the prism side surface 8L, are radiated from the prism rear surface 8B, and are guided through the imaging lens 9 onto the right half surface 10R of the imaging surface of the imaging device 10.

In the case of the light rays 18L that correspond to the left-side scene, as the light rays 18L and 18R are symmetric, similarly to the light rays 18R, the light rays 18L are not guided onto the right half surface 10R of the imaging surface of the imaging device 10 but are guided onto the left half surface 10L thereof. In this manner, the right- and left-side scenes are photographed at the same time by the picture camera apparatus 11A.

Figure 8:
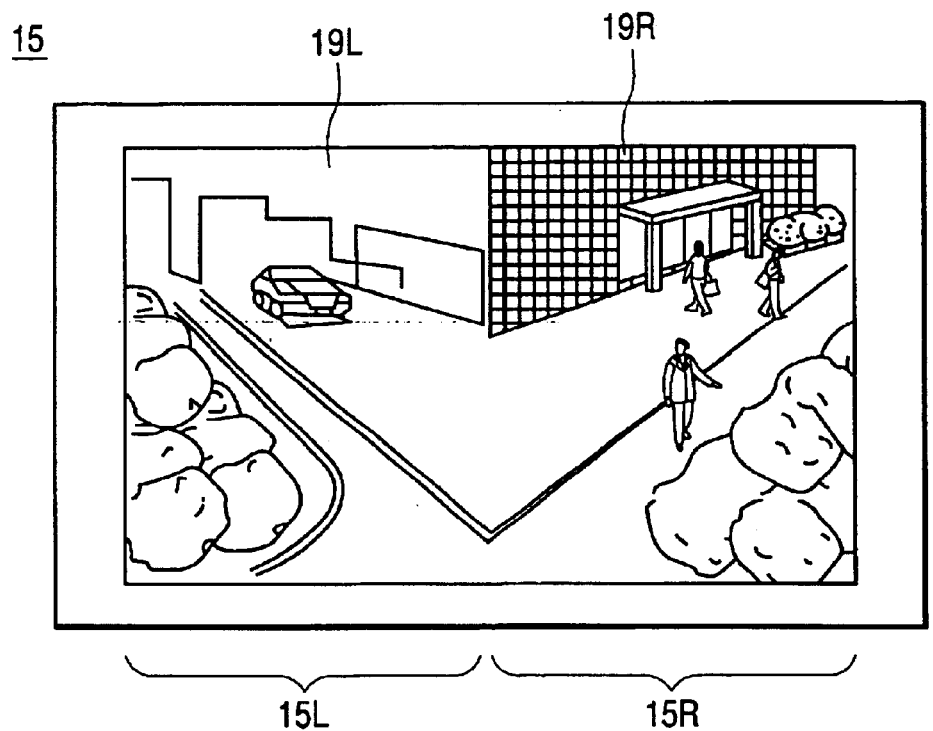
FIG. 8 is an explanatory view of a display state of a display screen in a vehicle periphery visual confirming apparatus according to the invention.
Figure 9:
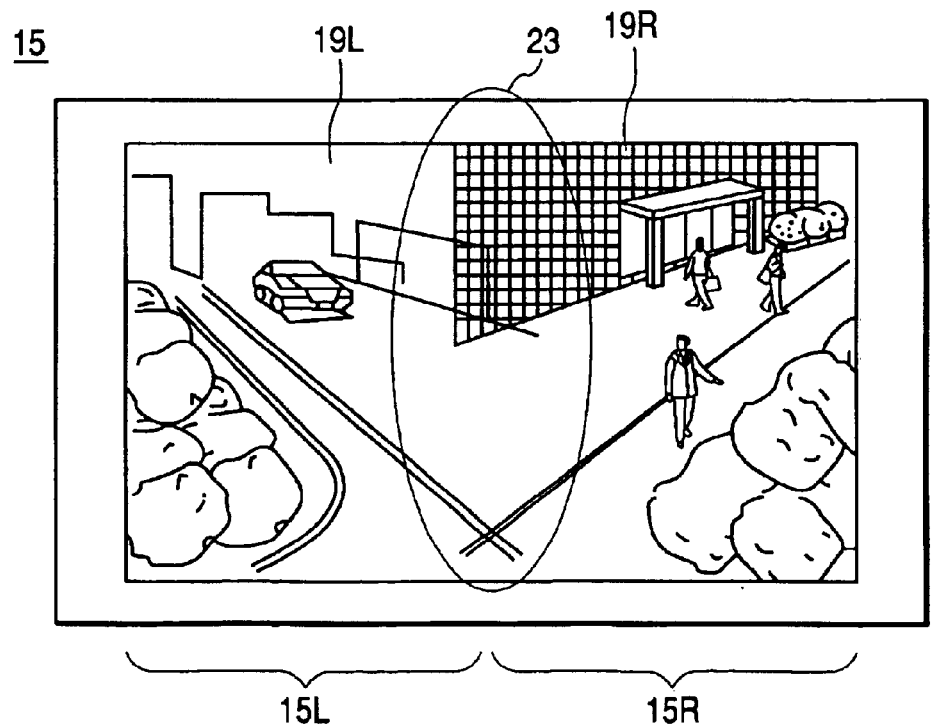
FIG. 9 is an explanatory view of a display state of a display screen in a conventional vehicle periphery visual confirming apparatus.

And, the light rays 18R and 18L, which have been guided onto the right half surface 10R and left half surface 10L of the imaging surface of the imaging device 10 respectively, are converted into image signals by the imaging device 10, are mirror image reversal processed by the mirror image reversal processing part 12, and are then output to the display part 15. And, in the display part 15, as shown in FIG. 8, the left-side scene photographed through the penetration window portion 2L is displayed as left-side scene images 19L in the left half screen 15L of the display part 15, whereas the right-side scene photographed through the penetration window portion 2R is displayed as right-side scene images 19R in the right half screen 15R of the display part 15.

According to the above-structured vehicle periphery visual confirming apparatus 1A, because the vertical angle portion 5 of the prism 4 is chamfered in such a manner that the vertical angle adjacent areas 5L, 5R thereof are cut away and the chamfered surface 5a is processed so as to provide a rough surface, the light rays 18R (18L) entering the portion where the vertical angle adjacent area 5R (5L) was once present pass through the chamfered surface 5a and go to the outside through the penetration window portion 2L (2R), or, they enter the chamfered surface 5a, are scattered by the rough surface of the chamfered surface 5a, whereby they are prevented from advancing into the prism 4. This can prevent occurrence of a phenomenon that the light rays 18R (18L) corresponding to the right-side (left-side) scene advance into the prism 4 through the vertical angle adjacent area 5R (5L), are reflected by the internal surface of the other prism side surface 8L (8R), and are then guided onto the left half surface 10L (10R) of the imaging device 10 which is the imaging surface for the opposite-side scene. Therefore, in the display part 15, as shown in FIG. 8, the left-side scene images 19L corresponding to the left-side scene are displayed on the left half screen 15L in such a manner that the images are not overlapped in the central portion of the screen, while the right-side scene images 19R corresponding to the right-side scene are similarly displayed on the right half screen 15R. This makes it possible to supply a driver with a vehicle peripheral scene picture which is easy to confirm visually.

By the way, in the present embodiment, description has been given on the assumption that the picture camera apparatus 11A is disposed on the front bumper 17 or front grille of the vehicle 16 and the right-side and left-side scenes in front of the vehicle are photographed by the picture camera apparatus 11A. However, this is not limitative but, alternatively, the picture camera apparatus 11A may be disposed on a rear bumper of the vehicle 16 and the right-side and left-side scenes in the rear of the vehicle may be photographed by the picture camera apparatus 11A. Of course, scenes before and behind the vehicle 16 may also be photographed.

(Second Embodiment)

Figure 3:
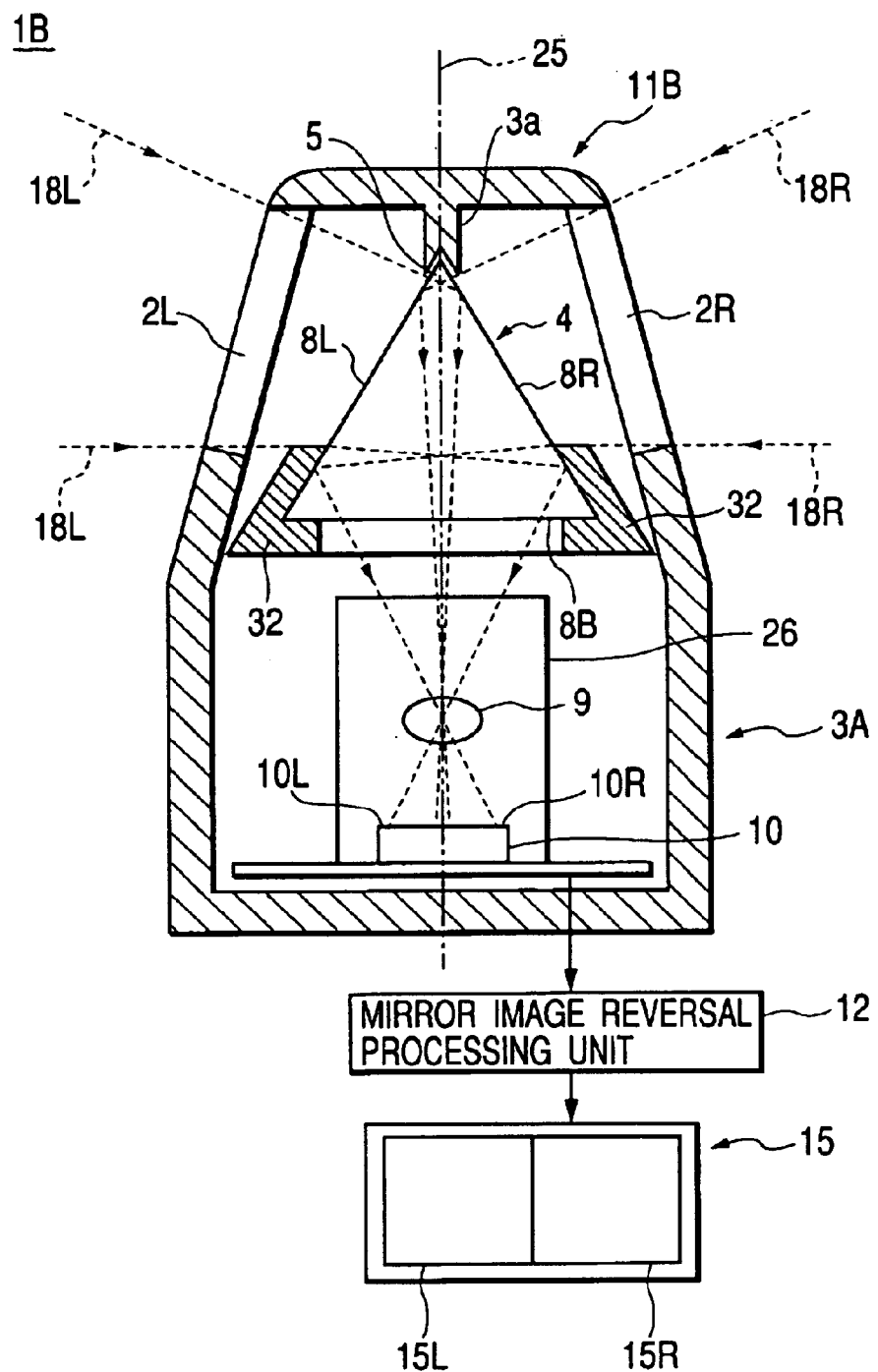
FIG. 3 is a schematic view of the structure of a vehicle periphery visual confirming apparatus according to the second embodiment of the invention.
Figure 4:
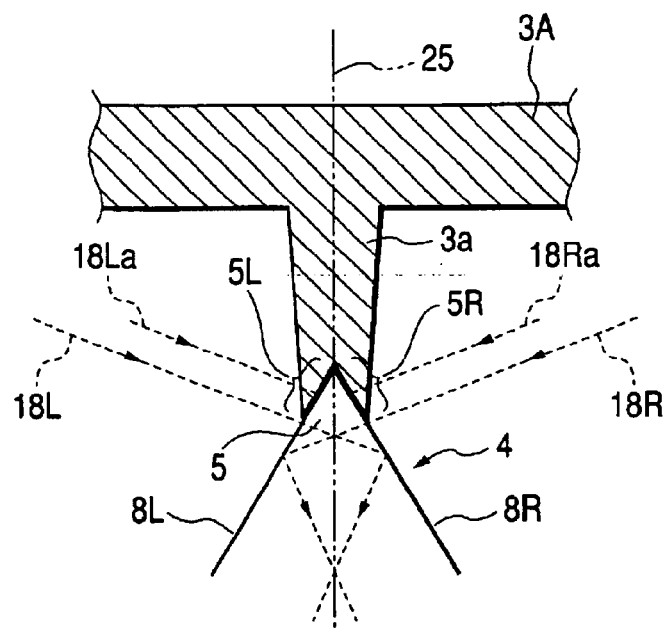
FIG. 4 is an enlarged view of the vertical angle adjacent portion of a prism forming a part of a vehicle periphery visual confirming apparatus according to a second embodiment of the invention.

Now, description will be given below of a second embodiment of a vehicle periphery visual confirming apparatus according to the invention with reference to FIGS. 3 and 4. FIG. 3 is a schematic view of the structure of a second embodiment of a vehicle periphery visual confirming apparatus according to the invention, and FIG. 4 is an enlarged section view of the vertical angle adjacent portion of a prism forming a part of the present vehicle periphery visual confirming apparatus. By the way, in FIGS. 3 and 4, the parts as those employed in the first embodiment are given the same designations and thus the description thereof is omitted here, while description will be given below of only the parts that are different from the first embodiment.

A picture camera apparatus 11B according to the second embodiment, as shown in FIGS. 3 and 4, is almost similar in structure to the first embodiment, except for the following aspect: that is, in the first embodiment, the vertical portion 5 of the prism 4 is chamfered but, in the second embodiment, instead of such chamfering operation, a light shield portion (light shielding member) 3a is disposed so as to cover the vertical angle adjacent areas 5L, 5R of the prism side surfaces 8L, 8R.

The light shield portion 3a is formed integral with a case 3A in such a manner that it is provided on and projected from the internal surface of the front portion of the case 3A. And, the leading end portion of the light shield portion 3a, as shown in FIG. 4, is formed in a V-shaped recess having the same angle as the vertical angle of the vertical angle portion 5 of the prism 4; and, here, it is formed so as to be able to cover only the vertical angle adjacent areas 5L, 5R specified in the first embodiment. By the way, preferably, the leading end portion of the light shield portion 3a may be formed so as to cover only the vertical angle adjacent areas 5L, 5R. However, the leading end portion of the light shield portion 3a may also be formed so as to cover the range that includes the vertical angle adjacent areas 5L, 5R.

Since the light shield portion 3a is formed so as to cover the vertical angle adjacent areas 5L, 5R of the prism side surfaces 8L, 8R, of the light rays 18R (18L) that correspond to the right-side scene, the light rays entering the vertical angle adjacent area 5R (5L) like the light rays 18Ra (18La) shown in FIG. 7, as shown in FIG. 4, are shielded by the light shield portion 3a and are thereby prevented from entering the interior portion of the prism 4. Therefore, it is possible to prevent a phenomenon occurring in the conventional vehicle periphery visual confirming apparatus that the light rays 18R (18L) corresponding to the right-side (left-side) scene enter through the vertical angle adjacent area 5R (5L) into the prism 4, are reflected by the internal surface of the other prism side surface 8L (8R), and are guided onto the left half surface 10L (right half surface 10R) of the imaging device 10 which is the imaging surface for the opposite-side scene.

By the way, in the case of the light rays 18R, 18L which enter the other areas of the prism side surfaces 8R, 8L than the vertical angle adjacent areas 5R, 5L, they are processed similarly to the first embodiment and thus the description thereof is omitted here.

In the above-structured vehicle periphery visual confirming apparatus 1B as well, there can be provided a similar effect to the vehicle periphery visual confirming apparatus 1A according to the first embodiment.

(Third Embodiment)

Figure 5:
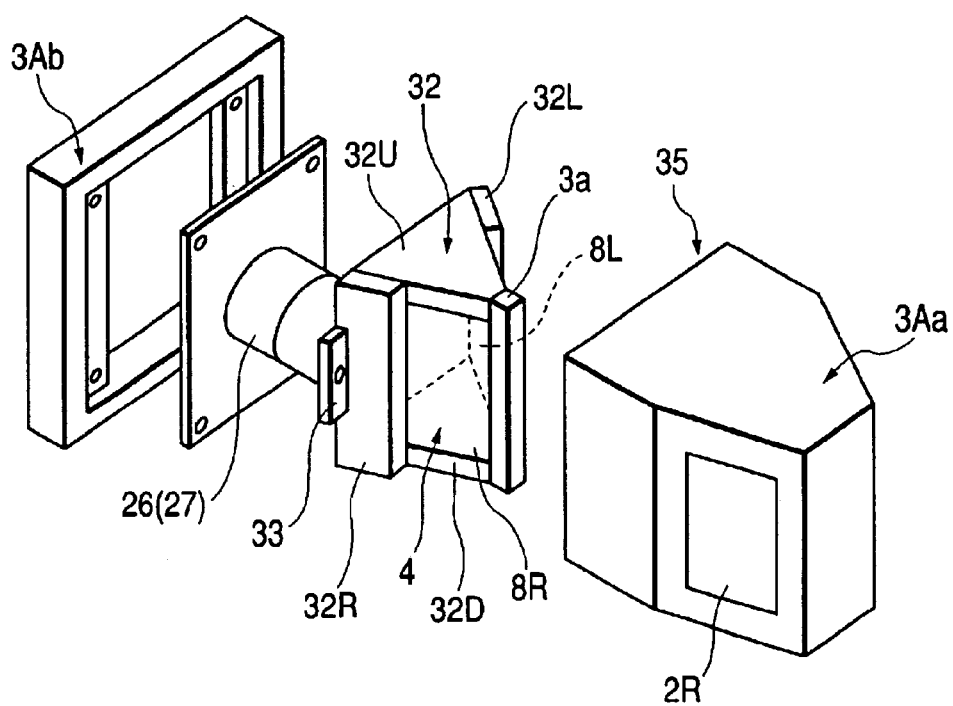
FIG. 5 is an exploded perspective view of a picture camera apparatus forming a part of a vehicle periphery visual confirming apparatus according to a third embodiment of the invention.
Figure 6:
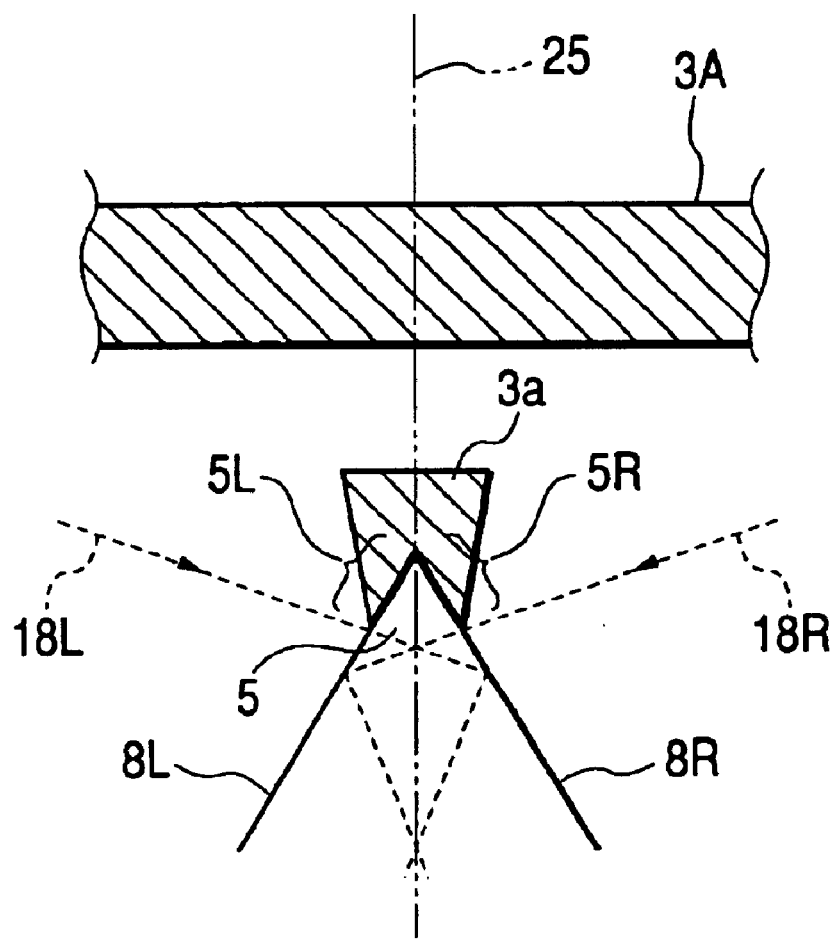
FIG. 6 is an enlarged view of the vertical angle adjacent portion of a prism forming a part of a vehicle periphery visual confirming apparatus according to the third embodiment of the invention.

Now, description will be given below of a third embodiment of a vehicle periphery visual confirming apparatus according to the invention with reference to FIGS. 5 and 6. FIG. 5 is an exploded perspective view of a picture camera apparatus forming a part of a vehicle periphery visual confirming apparatus according to the third embodiment of the invention, and FIG. 6 is an enlarged section view of the vertical angle adjacent portion of a prism forming a part of the present picture camera apparatus.

A picture camera apparatus 11C according to the present embodiment is structured almost similarly to the second embodiment except for the following aspect: that is, in the second embodiment, the light shield portion 3a is formed integral with the case 3A but, in the third embodiment, as shown in FIG. 5, a light shield portion 3a is formed integral with a prism fixing member 32 for fixing a prism 4 to a case main body 3Aa (which corresponds to the case 3A). Therefore, in FIGS. 5 and 6, the same parts as those employed in the second embodiment are given the same designations and thus the description thereof is omitted here, while description will be given below of only the parts that are different from the second embodiment.

The prism fixing member 32 is made of a light shielding member and, as shown in FIG. 5, is composed of a combination of hold portions 32L, 32R for holding the prism 4 from right and left so as to cover the rear-side areas of the prism side surfaces 8L, 8R of the prism 4, and hold portions 32U, 32D for holding the prism 4 from top and bottom so as to cover the upper and lower surfaces of the prism side surfaces 8L, 8R of the prism 4.

The hold portions 32L, 32R are used not only to hold the prism 4 from right and left but also to shield the unnecessary light rays that enter the rear-side areas of the prism side surfaces 8L, 8R but do not form the right- and left-side scenes. By the way, on the outer surfaces of the hold portions 32L, 32R, there are provided projections 33 which can be fixedly connected to the case main body 3Aa.

The light shield portion 3a (light shielding member) is formed as a light shielding rod body which is straddlingly interposed between the hold portions 32U, 32D of the prism fixing member 32 so as to cover the vertical angle portion 5 of the prism 4. The surface of the light shield portion 3a for covering the vertical angle portion 5 of the prism 4 is formed in a V-shaped recess shape having the same angle along the longitudinal direction thereof as the vertical angle of the vertical portion of the prism 4; and, here, it is formed so as to cover only the vertical angle adjacent areas 5L, 5R specified in the first embodiment. By the way, preferably, the V-shaped recessed surface of the light shield portion 3a may be formed so as to cover only the vertical angle adjacent areas 5L, 5R. However, the V-shaped recessed surface of the light shield portion 3a may also be formed so as to cover the range that includes the vertical angle adjacent areas 5L, 5R.

In the case of the prism 4 with the prism fixing member 32 and light shield portion 3a mounted thereon, by fixing the projections 33 of the prism fixing member 32 to the internal surface of the case main body 3Aa using screws, the prism 4 can be fixed to the interior portion of the case 3A in such a manner that the vertical angle portion 5 thereof faces the front portion of the case main body 3Aa and the prism side surfaces 8L, 8R thereof face the penetration window portions 2L, 2R of the case main body 3Aa.

Here, imaging means 27 is composed of an imaging lens 9 and an imaging device 10 respectively disposed within a lens holder 26. And, a rear case 3Ab with the imaging means 27 mounted therein is mounted into the rear-side opening 35 of the case main body 3Aa in such a manner that the imaging means 27 is stored in the case main body 3Aa, thereby forming the picture camera apparatus 11C. And, in case where the rear case 3Ab is mounted into the rear-side opening 35 of the case main body 3Aa, the case main body 3Aa and rear case 3Ab cooperate together in forming the case 3A (see FIG. 1).

In the above-structured vehicle periphery visual confirming apparatus 1C as well, there can be provided a similar effect to the vehicle periphery visual confirming apparatus 1A according to the first embodiment.

(Fourth Embodiment)

Figure 10:
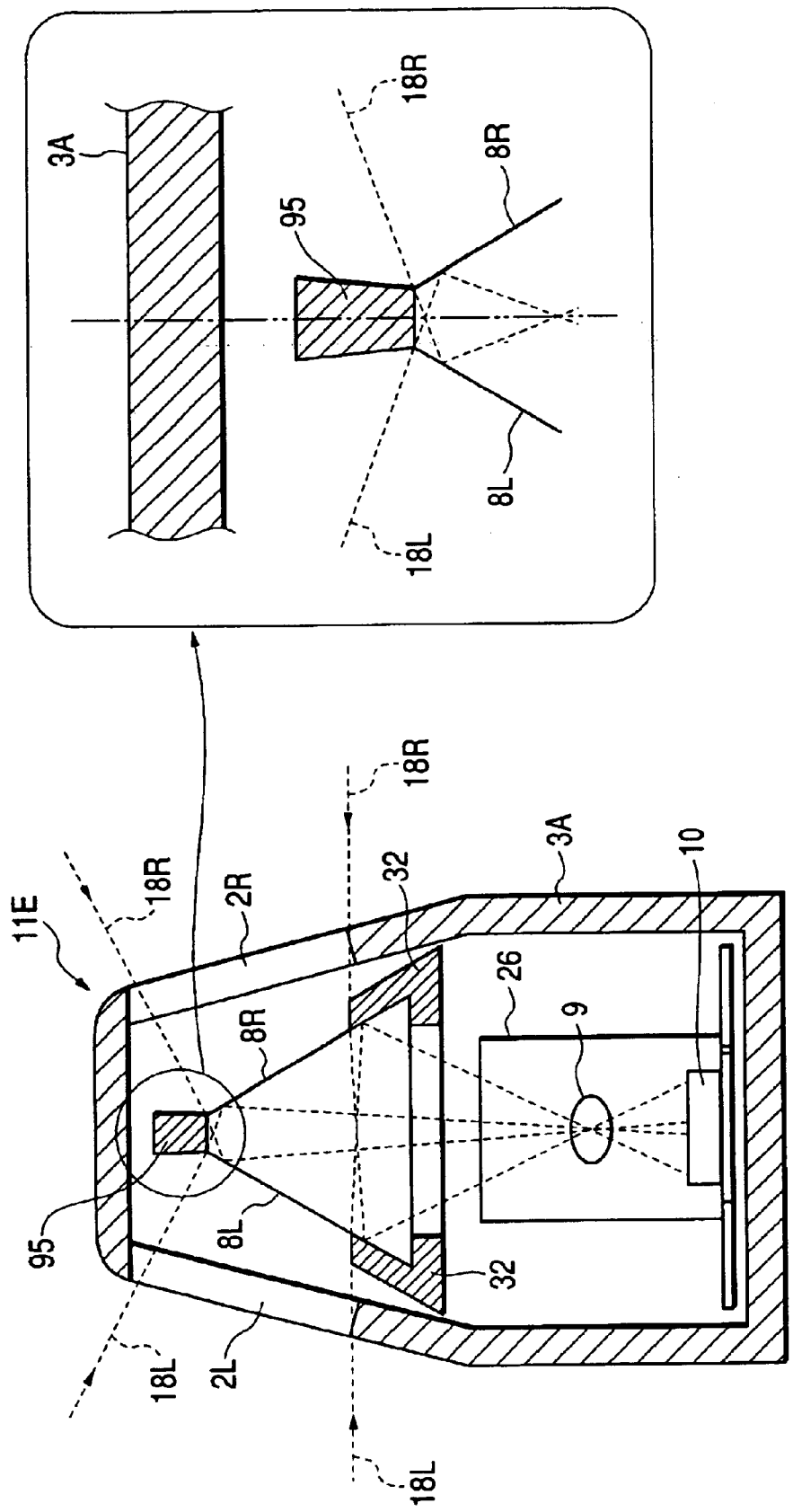
FIG. 10 is a schematic view of the structure of a vehicle periphery visual confirming apparatus according to a fourth embodiment of the invention.

Now, description will be given below of a fourth embodiment of a vehicle periphery visual confirming apparatus according to the invention with reference to FIG. 10. In FIG. 10, the parts as those employed in the first embodiment are given the same designations and thus the description thereof is omitted here, while description will be given below of only the parts that are different from the first embodiment.

FIG. 10 shows a picture camera apparatus 11E which includes a light shield portion (light shielding member) 95 disposed so as to shield the chamfered surface (i.e., the surface of the chamfered portion of the prism 4) from light. As shown in the blow-up portion of FIG. 10, the light shield portion 95 may be formed as a separate unit attached to the surface of the chamfered portion of the prism. Also, the light shield portion 95 may be formed integrally with the prism fixing member 32, in a way similar to that shown in FIG. 5.

(Fifth Embodiment)

Figure 11:
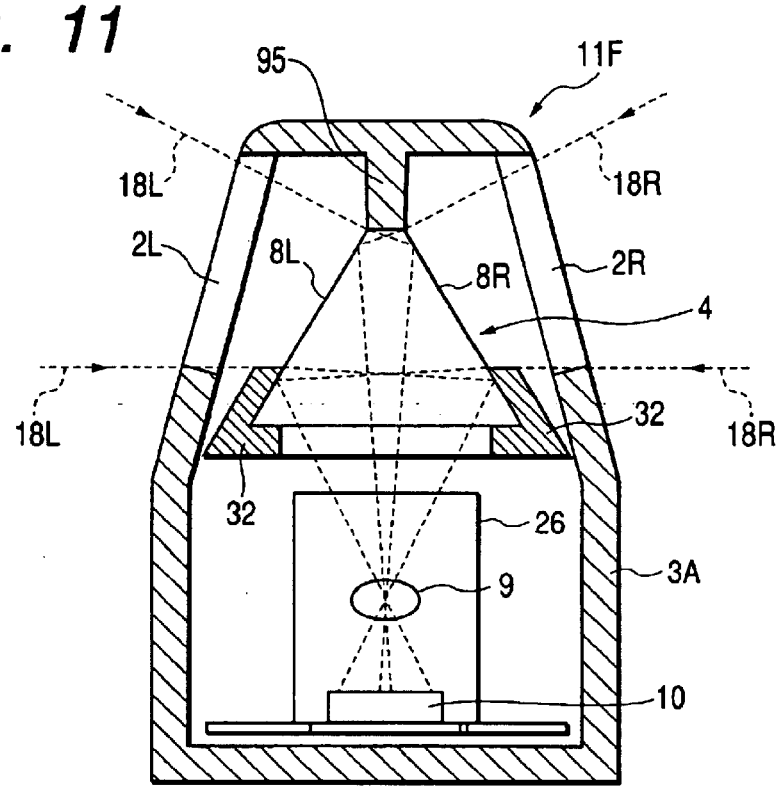
FIG. 11 is a schematic view of the structure of a vehicle periphery visual confirming apparatus according to a fifth embodiment of the invention.

FIG. 11 shows a picture camera apparatus 11F according to the fifth embodiment, where the light shield member 95 is integrally formed with the front portion of the case 3A.

(Sixth Embodiment)

Figure 12:
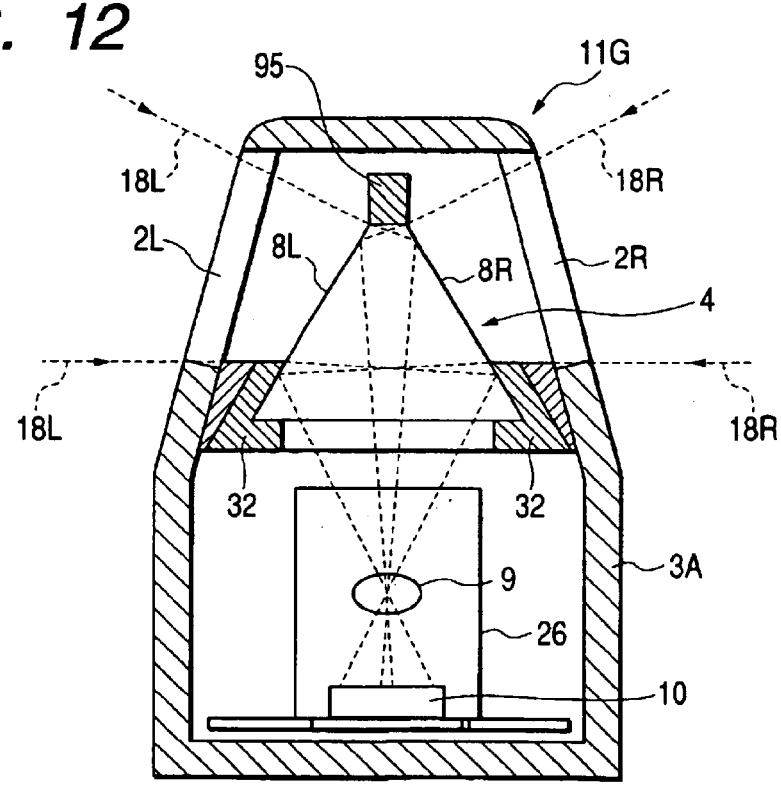
FIG. 12 is a schematic view of the structure of a vehicle periphery visual confirming apparatus according to a sixth embodiment of the invention.

FIG. 12 shows a picture camera apparatus 11G according to the sixth embodiment, where the prism fixing member 32 is integrally formed with the case 3A. In this embodiment, the case may have a removable side so that the prism may be installed.

According to the first to eighth aspects of the invention, the light rays (which penetrate through one of the penetration window portions and one of the vertical angle adjacent areas of the prism side surfaces sequentially, are reflected by the internal surface of the other-side prism side surface, are radiated from the prism rear surface, and are focused through the imaging lens onto the other-side half surface area of the imaging surface of the imaging device) can be prevented by the preventive means from advancing into the prism through the vertical angle adjacent areas of the two prism side surfaces. Also, according to the second aspect of the invention, the vertical angle portion of the prism is chamfered in such a manner that the vertical angle adjacent areas of the two prism side surfaces are cut away. Further, according to the third to fifth aspects of the invention, the light shield member is disposed on the vertical angle adjacent areas of the two prism side surfaces so as to cover these areas. In addition, according to the sixth aspect of the invention, the light shield portion is disposed over the surface of the chamfered portion of the prism so as to shield the surface of the chamfered portion of the prism from light. The light shield member may be formed integrally with a prism fixing member. Also, according to the seventh aspect of the invention, the light shield member is formed integrally with the a front portion of the case and shields the surface of the chamfered portion of the prism from light. Further, according to the eighth aspect of the invention, the prism fixing member is formed integrally with the case. Thanks to this, it is possible to prevent a phenomenon occurring in the conventional vehicle periphery visual confirming apparatus that the light rays penetrating through one of the penetration window portions enter the prism through the vertical angle adjacent area of the same-side prism side surface, are reflected by the internal surface of the other-side prism side surface, and are guided through the imaging lens onto the other-side half surface area of the imaging surface of the imaging device. Therefore, there is eliminated a possibility that the images to be essentially displayed in one-side half surface of the imaging surface of the imaging device can be guided into and displayed on the other-side half screen, and thus, when the images on the two sides are displayed on the display screen of the display part, can be prevented from being overlapped with each other in the central portion of the display screen. This makes it possible to supply a driver with good-visibility vehicle periphery images in which the images of the two side scenes are prevented from being overlapped together in the central portion of the display screen.

What is claimed is:

1. A vehicle periphery visual confirming apparatus including a picture camera apparatus disposed on an outside of a vehicle, said picture camera apparatus comprising:

a case including a pair of right and left penetration window portions respectively formed on two sides thereof;

a prism having an isosceles-triangular-shaped section and disposed within said case in such an attitude that its vertical angle portion faces a front portion of said case and its right and left prism side surfaces corresponding to two equal sides of its isosceles triangle shape respectively face said right and left penetration window portions;

an imaging lens disposed in a rear of a rear surface of said prism;

an imaging device which is disposed in a rear of said imaging lens and also which, when light rays entering from one of said right and left prism side surfaces are reflected by the other of said right and left prism side surfaces and are then radiated from the prism rear surface of said prism, focuses said light rays onto one of two half surface areas of an imaging surface of said imaging device through said imaging lens; and a preventing unit which is disposed in said vertical angle portion of said prism and prevents light rays from advancing into said prism through said vertical angle adjacent areas of said two prism side surfaces, in which said light rays penetrate through one of said penetration window portions and one of said vertical angle adjacent areas of said prism side surfaces sequentially, are reflected by an internal surface of said other-side prism side surface, are radiated from said prism rear surface, and are focused through said imaging lens onto said other-side half surface area of said imaging surface of said imaging device;

wherein:

the vertical angle portion of said prism is chamfered in such a manner that said vertical angle adjacent areas of said two prim side surfaces are cut away from said prism to form a chamfered surface; and said preventing unit is a light shielding member disposed over the chamfered surface and is formed integral with said case.

2. A vehicle periphery visual confirming apparatus including a picture camera apparatus disposed on an outside of a vehicle, said picture camera apparatus comprising:

a case including a pair of right and left penetration window portions respectively formed on two sides thereof;

a prism having an isosceles-triangular-shaped section and disposed within said case in such an attitude that its vertical angle portion faces a front portion of said case and its right and left prism side surfaces corresponding to two equal sides of its isosceles triangle shape respectively face said right and left penetration window portions;

an imaging lens disposed in a rear of a rear surface of said prism;

an imaging device which is disposed in a rear of said imaging lens and also which, when light rays entering from one of said right and left prism side surfaces are reflected by the other of said right and left prism side surfaces and are then radiated from the prism rear surface of said prism, focuses said light rays onto one of two half surface areas of an imaging surface of said imaging device through said imaging lens; and a preventing unit which is disposed in said vertical angle portion of said prism and prevents light rays from advancing into said prism through said vertical angle adjacent areas of said two prism side surfaces, in which said light rays penetrate through one of said penetration window portions and one of said vertical angle adjacent areas of said prism side surfaces sequentially, are reflected by an internal surface of said other-side prism side surface, are radiated from said prism rear surface, and are focused through said imaging lens onto said other-side half surface area of said imaging surface of said imaging device;

wherein:

the vertical angle portion of said prism is chamfered in such a manner that said vertical angle adjacent areas of said two prism side surfaces are cut away from said prism to form a chamfered surface; and said preventing unit is a light shielding member disposed over the chamfered surface and is formed integral with a prism fixing member for fixing said prism to said case.

3. A vehicle periphery visual confirming apparatus including a picture camera apparatus disposed on an outside of a vehicle, said picture camera apparatus comprising:

a case including a pair of right and left penetration window portions respectively formed on two sides thereof;

a prism having an isosceles-triangular-shaped section and disposed within said case in such an attitude that its vertical angle portion faces a front portion of said case and its right and left prism side surfaces corresponding to two equal sides of its isosceles triangle shape respectively face said right and left penetration window portions;

an imaging lens disposed in a rear of a rear surface of said prism;

an imaging device which is disposed in a rear of said imaging lens; and a preventing unit which is disposed in said vertical angle portion of said prism and prevents light rays from advancing into said prism through said vertical angle adjacent areas of said two prism side surfaces;

wherein:

the vertical angle portion of said prism is chamfered in such a manner that said vertical angle adjacent areas of said two prism side surfaces are cut away from said prism to form a chamfered surface; and said preventing unit is a light shielding member disposed over the chamfered surface and is formed integral with said case.

4. A vehicle periphery visual confirming apparatus including a picture camera apparatus disposed on an outside of a vehicle, said picture camera apparatus comprising:

a case including a pair of right and left penetration window portions respectively formed on two sides thereof;

a prism having an isosceles-triangular-shaped section and disposed within said case in such an attitude that its vertical angle portion faces a front portion of said case and its right and left prism side surfaces corresponding to two equal sides of its isosceles triangle shape respectively face said right and left penetration window portions;

an imaging lens disposed in a rear of a rear surface of said prism;

an imaging device which is disposed in a rear of said imaging lens; and a preventing unit which is disposed in said vertical angle portion of said prism and prevents light rays from advancing into said prism through said vertical angle adjacent areas of said two prism side surfaces;

wherein:

the vertical angle portion of said prism is chamfered in such a manner that said vertical angle adjacent areas of said two prism side surfaces are cut away from said prism to form a chamfered surface; and said preventing unit is a light shielding member disposed over the chamfered surface and is formed integral with a prism fixing member for fixing said prism to said case.

* * * * *

UNITED STATES PATENT AND TRADEMARK OFFICE
CERTIFICATE OF CORRECTION

PATENT NO.    : 6,788,478 B2
DATED         : September 7, 2004
INVENTOR(S)   : Masayoshi Imoto It is certified that error appears in the above-identified patent and that said Letters Patent is hereby corrected as shown below:

<u>Title page,</u>
Item [63], Related U.S. Application Data, please change "Jun. 18, 2001" to -- Jul. 18, 2001 --.

Signed and Sealed this

Third Day of May, 2005

JON W. DUDAS
*Director of the United States Patent and Trademark Office*